Feb. 28, 1961

B. F. WEHMER 2,973,187

VACUUM SPATULATOR

Filed Aug. 11, 1958

INVENTOR.
Bruno F. Wehmer
BY
Attys.

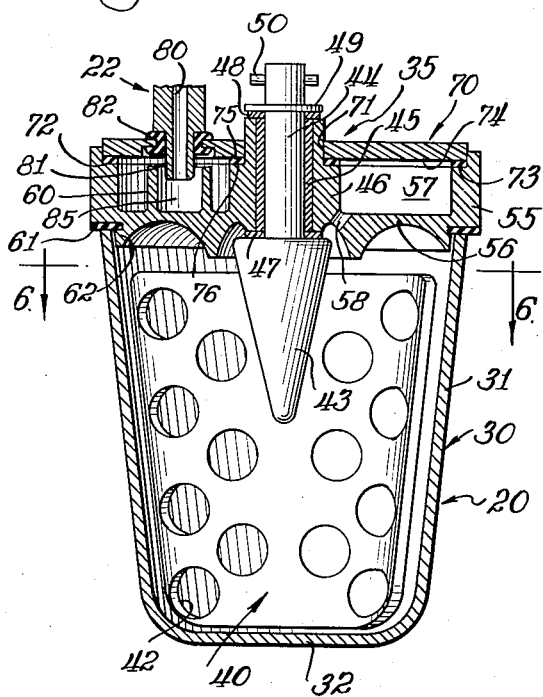
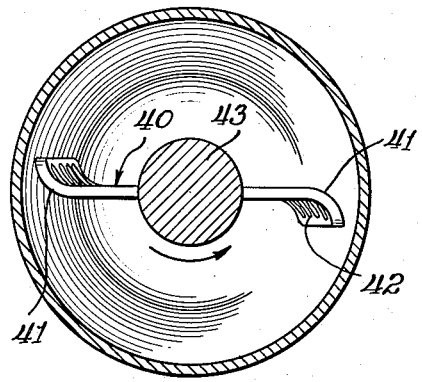
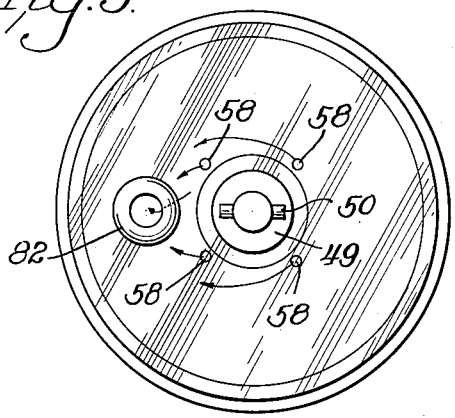
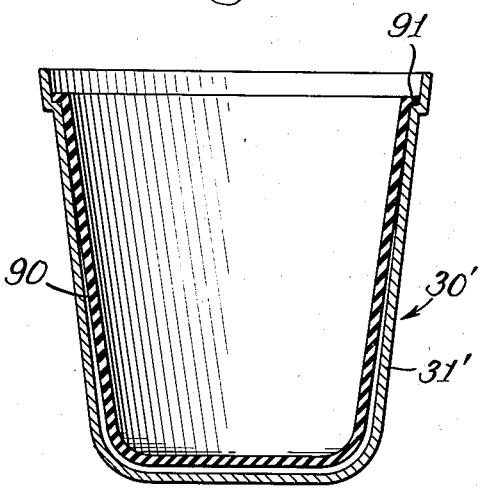

United States Patent Office 2,973,187
Patented Feb. 28, 1961

2,973,187

VACUUM SPATULATOR

Bruno F. Wehmer, 7 Imperial St., Park Ridge, Ill.

Filed Aug. 11, 1958, Ser. No. 754,455

3 Claims. (Cl. 259—108)

This invention relates generally to mixing devices and more particularly to devices for mixing plastic materials in an evacuated atmosphere.

In brief, the present invention is directed to an improved vacuum spatulator especially directed to the intermixing of dental impression materials, such as plaster or other known plastic substances used for similar purposes and in circumstances in which it is particularly desirable to rid the mixture substantially free of entrained air. To this end, a mixing chamber is provided with an attachment to a vacuum pump and includes a motor-driven agitator or spatulator. A cover is provided in sealed relationship over the mixing chamber and includes a vacuum seal and a driving bearing means for the passage of a drive shaft to the agitator. A vacuum connection is also included for joining the interior of the container to a vacuum source. In order to avoid clogging the vacuum connection and the adjacent passageways with material being spatulated, an intermediate settling chamber is provided, according to this invention, between the interior of the mixing chamber and the vacuum fitting to trap any of the material withdrawn from the mixing chamber by the air evacuation. Additionally, the cover is transparent, particularly opposite the intermediate chamber or trap to permit the operator to visually perceive the migration of any material into the trap. Means are also provided for easily removing the mixing materials from the mixing chamber and trap and for maintaining the vacuum condition to avoid air inclusion in the mixture, even though the agitator be detached from the drive motor.

The main object of this invention is to provide a new and improved vacuum spatulator for mixing plastic masses.

Another object of this invention is to provide a new and improved vacuum spatulator, as aforesaid, which includes a trap or chamber designed to prevent the escape of mixture materials into the vacuum line associated with the mixing container.

A still further object of this invention is to provide an improved device for mixing plastic materials in which it is desired to withdraw included air or gases by vacuum means and which is provided with a means for visually perceiving any tendency of the vacuum force to withdraw materials being mixed from the mixing chamber thereof.

Still another object of this invention is to provide a new and improved vacuum spatulator, as aforesaid, which is equipped with an improved cover means having a trap or chamber visible to the operator for trapping materials escaping under vacuum from the mixing chamber.

The above and further objects, features, and advantages of my invention will appear to those familiar with the art from the following detailed description and specifications of a preferred form and modification of this invention as illustrated in the accompanying drawings, wherein like parts are designated with like numerals for the sake of brevity of description.

In the drawings:

Figure 4 is a sectional view taken substantially from vantage line 4—4 of Figure 1, such view being at an enlarged scale and showing the details of the improved mixing vessel of this invention;

Figure 5 is a top plan view of the mixing vessel shown in Figure 4;

Figure 6 is a cross-sectional view taken substantially at line 6—6 of Figure 4, looking in the direction of the arrows thereon; and Figure 7 is a cross-sectional view, similar to Figure 4, showing a modified form of mixing vessel contemplated by this invention.

Figure 1:
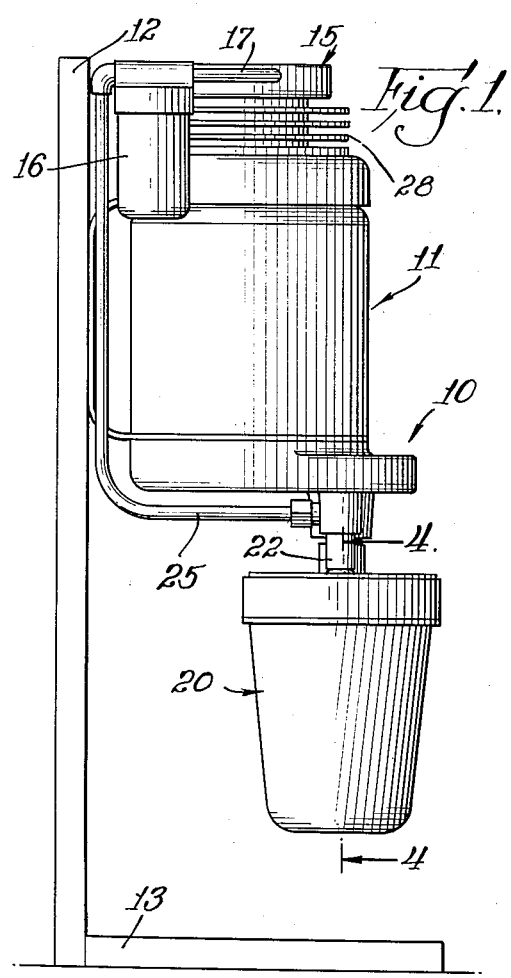
Figure 1 is a side elevational view of an improved mixing device according to my invention.
Figure 2:
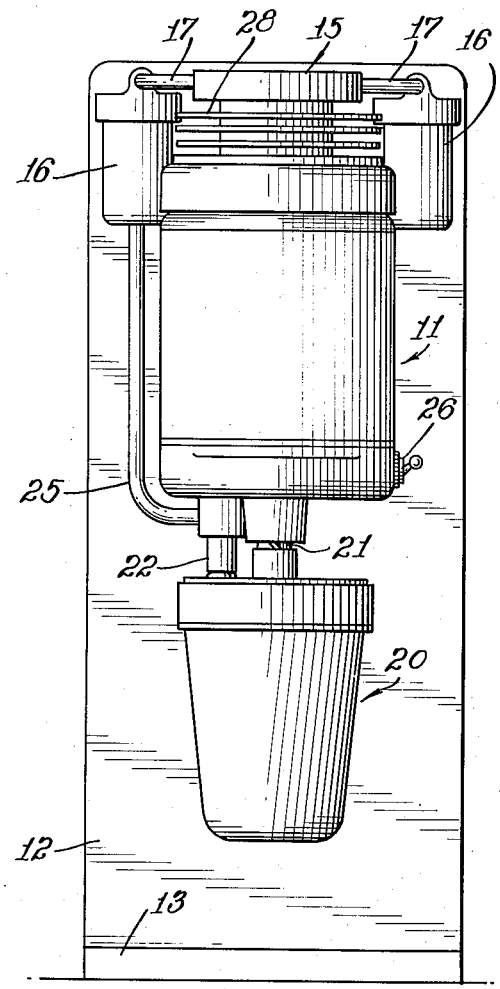
Figure 2 is a front elevational view of the same.
Figure 3:
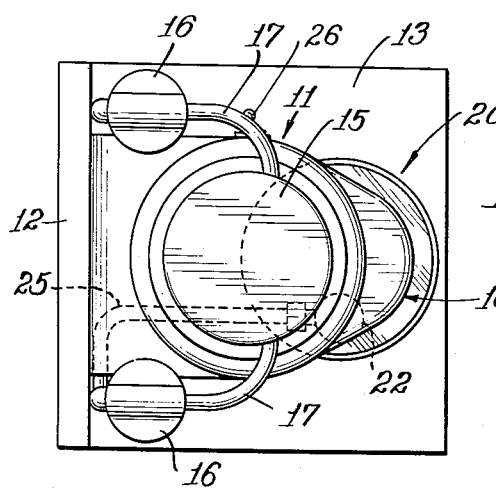
Figure 3 is a top plan view of the same.

Referring now to the drawings, and particularly to Figures 1–3, it will be understood that the improved spatulator of this invention, indicated generally at numeral 10, includes an electric drive motor 11 mounted on an upright pedestal 12, associated with a pedestal base 13. The motor 11 drives a conventional vacuum pump 15 mounted over the upper end of the motor and including a pair of vacuum accumulator and separator chambers 16, 16, each communicating with the vacuum pump by a suitable conduit 17. Mounted below the motor and in coaxial alignment therewith is an improved spatulating vessel or mixing cup 20 which embodies the major features of this invention; the same being coupled to and suspended from a drive shaft 21 of the motor, while a vacuum fitting 22 serves to connect the same to the vacuum pump 15 through an intervening vacuum line 25.

Motor 11 preferably is equipped with a suitable electrical conductor (not shown) for energizing the same from a wall outlet associated with a conventional 110 volt 60 cycle A.C. power supply or the like. A switch 26 is included in the motor circuit for on-and-off operational control of the motor and vacuum pump unit 15.

The vacuum pump is of conventional and known construction and therefore will not be described in particular detail herein, other than to mention that the same is compact and held to minimum size within its operational requirements. Such conveniently may be air cooled, as shown, by plural fins 28, 28. The accumulator separator chambers 16, 16 and vacuum lines 17 and 25 are also of conventional and known construction and operation, and therefore will not be described in detail.

Turning now more to the details and structural aspects of the improved spatulating chamber or mixing cup assembly 20, reference is especially made to Figures 4, 5, and 6 of the drawings. It will be recognized therefrom that the mixing chamber assembly 20 includes a substantially cup-shaped vessel 30 having frusto-conical side walls 31 and an integral bottom wall 32; such vessel being open at its upper end, which is enclosed by an improved cap or cover assembly 35, according to this invention.

Mounted within the cup 30 is a spatulator paddle 40 having diametrically opposed arm portions 41, 41 (see Figure 6) which include a plurality of openings or limber holes 42 (see Figure 4) for passage of the paddle through the material being spatulated or mixed such as plaster of Paris. The paddle 40 is connected adjacent its upper end to a substantially conical-shaped hub 43 at the lower end of a stub shaft 44, the latter of which extends through a sleeve bearing 45 housed in a bearing hub 46 centrally of the cover 35. A seal washer 47 is provided around shaft 44 between the upper end of the hub portion 43 and the lower end of the bearing hub 46 and washer 48 is similarly provided at the upper end of the bearing hub 46 beneath a metal friction washer 49. This arrangement provides a reasonably sealed passageway for the stub shaft 44. The upper end of such shaft is also equipped with a cross pin 50 adapted to enter a bayonet slot connector at the lower end of the motor drive shaft 21.

The cover assembly 35, in addition to the bearing 45 and the hub portion 46, is formed as a substantially cylindrical-shaped member having an annular outer wall portion 55 which is concentric with the hub portion and joined thereto by a generally annular bottom wall 56, thereby defining an annular separating chamber 57. Chamber 57 communicates with the interior of the cup member 30 by means of plural sloping air passageways 58 and a cylindrical separating trap 60 disposed appropriately beneath and opposite the vacuum inlet connection 22, as will hereinafter be set forth.

To provide a seal between the cylindrical side wall portion 55 of the cover assembly and the upper end of the mixing cup, an annular resilient gasket 61, or a like sealing device, may be employed, as illustrated in Figure 4. To maintain the mixing cup 30 in concentric relation with the cover assembly 35, the lower wall 56 of such cover member is provided with a depending peripheral flange portion 62 which bears close fitting engagement with the upper interior of the mixing cup wall 31, providing thereby a frictional lock between the cup and cover. Other interlocking mechanisms may be employed, as suitable, for insuring positive connection between the mixing cup and cover.

In order to enclose the annular chamber 57 of the cover assembly 35, a transparent cover plate 70 comprising a generally annular disc having a central opening 71 is provided. Disc 70 is of smaller diameter than the cylindrical side walls 55 of the cover member and is fitted into a shoulder recess 72 at the upper end of the latter. A resilient gasket 73 is disposed between the lower face 74 of the cover disc and the shoulder 72 to provide a seal. A similar seal ring 75 is disposed around the substantially cylindrical hub portion 46 on top of an outset shoulder portion 76 thereon, to engage the underface 74 of the cover disc; the same receiving hub 46 through its central opening 71. In this manner, the cover disc 70 is adequately sealed with vacuum chamber 57 to maintain vacuum pressures, as applied through the vacuum nipple connection 22 and pump 15.

To couple the cover assembly to the vacuum connection 22, the latter member is formed with a generally cylindrical configuration provided with a central opening 80 and a depending or downwardly extending nipple portion 81. The nipple portion 81 is adapted to enter and project through an annular seal grommet 82, mounted in an opening of the cover disc 70 opposite the cylindrical trap 60.

With the above-described arrangement, the agitator 40 is supported by and beneath the cover assembly 35 with its shaft 44 being coupled to the bayonet-type connector associated with the drive motor shaft. The intake of the vacuum pump is brought to the lower end of the motor by the vacuum line 25 and the attachment nipple portion 81 is extended through the cover disc 70 and grommet 82 into the separating trap 85. Preferably, the cover disc 70 is transparent, as previously mentioned, so that when mixing under vacuum, any plastic material drawn into chamber 57 will be trapped and readily visible to the operator. In the event that the plaster, or like material, enters the chamber 57 or the trap 85, the operation may be halted, the cover removed, and the same washed from chambers 57 and 85 before it has an opportunity to harden and clog the vacuum passageways.

In addition to the above-noted features, an auxiliary feature is provided by the extended length of the nipple portion 81 on the vacuum connector 22. Due to such elongated configuration, the spatulator or paddle 40 may be detached from driving coupling with the motor, while the motor remains running without losing the evacuated atmosphere within the mixing cup by simply lowering the mixing cup without fully withdrawing nipple 81 from the grommet 82. Thus the cup 31 may be held under vacuum atmospheres until the agitation or movement of the paddle member 40 has stopped to prevent the inclusion of air in the mixture, as would happen if the atmosphere were permitted to enter the mixing cup with the paddle 40 turning. This feature is especially gratifying where intermediate inspection of the plastic mass is desired.

In Figure 7, I have shown an alternate mixing bowl 30' which comprises a plastic or other suitable materialed outer bowl 31' and a rubber insert bowl 90 adapted to nest within the outer bowl 31'. The rubber insert bowl is provided with a seal lip 91 at its upper end and is readily removable from the outer metal bowl 31'. Due to the resilient flexible nature of its walls, such inner bowl readily lends itself to cleaning hardened plastic material therefrom, particularly hardened plaster of Paris or the like.

From the foregoing, it is believed that those familiar with the art will readily recognize and appreciate the novel features and advantages of my invention and will understand that while I have herein described the same as it appears in association with a preferred and modified form thereof, nevertheless, numerous changes, modifications, and substitutions of equivalents may be made therein without necessarily departing from the spirit and scope of its invention. Consequently, it is not my intention to be limited to the particulars of the devices hereinabove described and shown except as may appear in the following appended claims.

I claim:

1. A device for mixing plastic materials comprising a mixing cup having an upper open end, a cover for the open end of said cup, paddle means insertable through the open end of said cup and supported on said cover for rotation within the interior of said cup, an enclosed chamber formed entirely within the confines of said cover whereby said chamber is positioned outwardly of the opening in said cup, said chamber communicating with the interior of said cup, a vacuum connector on said cover communicating with said chamber therein, motor means for rotatably driving said paddle means, a vacuum pump having connection with said vacuum connector for evacuating the atmosphere of said chamber and cup, and trap means in the chamber of said cover opposite said vacuum connector for preventing the passage of plastic materials into the said connector.

2. In a device for mixing plastic materials including a mixing cup having an open upper end, means for agitating material within said cup and a vacuum pump for evacuating the atmosphere of the cup during the mixing operation, an improved cover for the mixing cup comprising, a main body portion adapted to fit with sealed engagement over the open upper end of the mixing cup, said body portion including a central hub for rotatably mounting the agitator means, a substantially annular chamber formed in said body portion, said body portion having passage means interconnecting said chamber with the interior of said cup, a transparent cover wall overlying said chamber and sealing the same, a coupling on said cover wall for connection with said vacuum pump, and a cup-like trap within said chamber opposite said coupling, said trap projecting upwardly in said chamber and serving as a device for separating material being mixed from air being evacuated from said cup.

3. In a device for mixing plastic materials including a mixing cup having an open end and means for agitating material within said cup, the mixing operation being conducted in an evacuated atmosphere, an improved cover means for said cup, comprising, a generally cylindrical member adapted to seal over the open end of said cup and providing for the passage of drive means associated with the agitating means, an annular chamber formed entirely within the confines of said cover whereby said chamber is positioned outwardly of the opening in said cup, a removable cover wall on said chamber, said chamber communicating with the interior of said cup, a vacuum line connector in said cover wall for placing said chamber in communication with a vacuum pump whereby air in said mixing cup may be withdrawn through said chamber, and trap means adjacent said connector for separating plastic materials from the air being evacuated from the cup thereby to maintain the said vacuum connector unclogged.

References Cited in the file of this patent
UNITED STATES PATENTS

| | | |
|---|---|---|
| 2,183,763 | Brown | Dec. 19, 1939 |
| 2,251,203 | Ramsay | July 29, 1941 |
| 2,257,945 | Fraser | Oct. 7, 1941 |
| 2,696,022 | Steinbock et al. | Dec. 7, 1954 |